United States Patent
Madsen et al.

(10) Patent No.: US 11,091,711 B2
(45) Date of Patent: Aug. 17, 2021

(54) SEPARATOR SYSTEM AND TAR REFORMER SYSTEM

(71) Applicant: HALDOR TOPSØE A/S, Kgs. Lyngby (DK)

(72) Inventors: Jørgen Madsen, Hillerød (DK); Erik Gambarini, Vanløse (DK); Erik Løgsted-Nielsen, Copenhagen (DK)

(73) Assignee: HALDOR TOPSØE A/S, Lyngby (DK)

( * ) Notice: Subject to any disclaimer, the term of this patent is extended or adjusted under 35 U.S.C. 154(b) by 229 days.

(21) Appl. No.: 16/324,119

(22) PCT Filed: Aug. 22, 2017

(86) PCT No.: PCT/EP2017/071134
§ 371 (c)(1),
(2) Date: Feb. 7, 2019

(87) PCT Pub. No.: WO2018/054635
PCT Pub. Date: Mar. 29, 2018

(65) Prior Publication Data
US 2020/0190417 A1   Jun. 18, 2020

(30) Foreign Application Priority Data
Sep. 21, 2016 (DK) .......................... PA 2016 00552

(51) Int. Cl.
C10K 1/02 (2006.01)
B04C 5/26 (2006.01)
C10K 3/00 (2006.01)
C10K 3/02 (2006.01)
C01B 3/58 (2006.01)

(52) U.S. Cl.
CPC ............... *C10K 1/026* (2013.01); *B04C 5/26* (2013.01); *C01B 3/58* (2013.01); *C10K 3/006* (2013.01);
(Continued)

(58) Field of Classification Search
CPC ........ C10K 1/026; C10K 3/006; C10K 3/023; C10K 1/02; B04C 5/26; C01B 2203/0435; C01B 2203/0465; C01B 3/58
See application file for complete search history.

(56) References Cited

U.S. PATENT DOCUMENTS 4,046,523 A   9/1977   Kalina et al.
4,348,486 A   9/1982   Calvin et al.
(Continued)

FOREIGN PATENT DOCUMENTS

CN   204345622 U   5/2015
CN   204490820     * 7/2015
(Continued)

OTHER PUBLICATIONS

International Search Report and Written Opinion issued in corresponding International Patent Application No. PCT/EP2017/071134, 8 pages (dated Oct. 19, 2017).
(Continued)

*Primary Examiner* — Prem C Singh
*Assistant Examiner* — Juan C Valencia
(74) *Attorney, Agent, or Firm* — Buchanan Ingersoll & Rooney P.C.

(57) ABSTRACT

A separator system for treating a gas from a biomass gasification system, including: first and second cyclones, where the first cyclone includes an inlet for receiving a gas from a biomass gasification unit, the first cyclone being arranged for removing particulate matter from the gas from the biomass gasification unit in order to provide a first cleaner gas, piping arranged to lead the first cleaner gas to the second cyclone, where the second cyclone is arranged to remove particulate matter from the first cleaner gas in order to provide a second cleaner gas, a pipe arranged to lead the second cleaner gas to a special piping element, the latter
(Continued)

including a burner, thereby providing a third cleaned gas, and a gas distribution unit arranged to lead the third cleaned gas to one or more tar reformer units. Also, a method of treating a gas from a biomass gasification system.

9 Claims, 2 Drawing Sheets

(52) U.S. Cl.
CPC ...... *C10K 3/023* (2013.01); *C01B 2203/0435* (2013.01); *C01B 2203/0465* (2013.01)

(56) References Cited

U.S. PATENT DOCUMENTS

| | | | |
|---|---|---|---|
| 2007/0094929 A1* | 5/2007 | Kang | C10K 1/026 48/111 |
| 2010/0181539 A1 | 7/2010 | Apanel et al. | |
| 2012/0234217 A1* | 9/2012 | Isaksson | F23G 7/065 110/346 |

FOREIGN PATENT DOCUMENTS

| | | |
|---|---|---|
| CN | 204490820 U | 7/2015 |
| JP | 2015059159 A | 3/2015 |
| WO | 2006031011 A1 | 3/2006 |

OTHER PUBLICATIONS

Search Report issued in corresponding Danish Patent Application No. PA201600552, 8 pages (dated Mar. 7, 2017).

* cited by examiner

SEPARATOR SYSTEM AND TAR REFORMER SYSTEM

FIELD OF THE INVENTION

The invention relates to a separator system for treating a gas from a biomass gasification system, a tar reformer system comprising a separator system according to the invention and a method for treating a gas from a biomass gasification system.

BACKGROUND

Gasification of biomass, waste or coal produces synthesis gas, a gas essentially comprising methane, carbon monoxide, hydrogen, water and carbon dioxide. Synthesis gas is also known as syngas. Syngas may be used as a source of fuel, hydrogen or carbon monoxide, or may be used for downstream syngas conversions. Manipulation of reaction equilibria and reaction conditions influences the ratio of the gaseous products and therefore provides the preferred gas (i.e. methane, hydrogen or carbon monoxide). Apart from the aforementioned main constituents the product gas from a gasifier contains sulphur compounds, e.g. $H_2S$ and COS, ammonia, dust, alkali, impurities such as P, As, Hg, etc. and tar components.

Steam reforming of tar, or tar reforming, is the process carried out over a catalyst to convert tar to syngas. The process of reducing the tar species present in syngas is part of the gas conditioning, i.e. the train of unit operations needed before the syngas may be utilised for downstream applications, such as synthesis of chemicals or electricity. Dust in the syngas may be removed upstream or downstream of the tar reforming step, corresponding to the embodiments of tar reforming taking place in nearly dust free or dusty environment. The term "clean tar reformer" is meant to denote a tar reformer in a biomass gasification system wherein a filter is present between a biomass gasification unit and the tar reformer. This is opposed to the term "dusty tar reformer" which is meant to denote a tar reformer in a biomass gasification system wherein no filter, besides possible cyclones for a coarse removal of dust, is present between the biomass gasification unit and the tar reformer. The catalysts may be present in pellet or monolith form, of which the monoliths and pellets may be used for the clean tar reformer, whereas monoliths must be applied for the dusty tar reformer. The process of the present invention is especially advantageous for use in a dusty environment, here referred to as dusty tar reforming.

In a dust-free environment, carbon coke formation from decomposition of syngas tar and hydrocarbons can take place in and on the catalyst, and/or carbon soot generated from partial combustion of the syngas from the gasifier can deposit and build up in and on the catalyst. This can lead to catalyst deactivation and/or increased pressure drop and inhomogeneous gas distribution due to locally increased restriction of gas passage through the catalyst volume. These phenomena all affect catalyst performance negatively. In addition, in a dusty environment the dust entrained in the gas can itself buildup in and on the catalyst, and lead to worsened, i.e. reduced, catalyst performance similar to the dust-free case. The dust has high carbon content, e.g. about 70% by weight, and is typically of a pyrolytic nature. Dust, coke, and soot, are all herein commonly referred to as carbonaceous materials.

Both for clean tar reforming and dusty tar reforming, the catalyst housed in the tar reformer unit will be exposed to entrained fine dust, fly ash soot and/or chemical poisons during operation, reducing the activity of the catalyst and thus requiring a regeneration of the catalyst to ensure prolonged catalyst lifetime. Tar reformer catalyst regeneration is however challenging in relation to the risk of excessive temperature development within the reformer as a result of the exothermic carbon combustion, as well as energy consumption.

It is an object of the invention to overcome or at least alleviate the problem of exposing the catalyst housed in the tar reformer unit to entrained fine dust, fly ash soot and/or chemical poisons during operation.

SUMMARY OF THE INVENTION

Embodiments of the invention generally relate to a separator system for treating a gas from biomass gasification system. The separator system comprises:

a first cyclone and a second cyclone, where said first cyclone comprises an inlet for receiving a gas from a biomass gasification unit, said first cyclone being arranged for removing particulate matter from the gas from the biomass gasification unit in order to provide a first cleaner gas, piping arranged to lead said first cleaner gas from said first cyclone to said second cyclone, where said second cyclone is arranged to remove particulate matter from said first cleaner gas in order to provide a second cleaner gas, a pipe arranged to lead said second cleaner gas to a special piping element, said special piping element comprising a burner for heating the second cleaner gas and burning off particulate matter in the second cleaner gas, thereby providing a third cleaned gas, and gas distribution unit arranged to lead said third cleaned gas to one or more tar reformer units.

When the separator system of the invention comprises two cyclones and a special piping element, the gas from the biomass gasification system is step by step cleaned. The burner in the special piping element provides for a sufficient increase in the temperature of the third cleaned gas before the third cleaned gas is led to tar reformer unit(s). Moreover, the burner burns off hydrocarbons in the second cleaner gas, and it burns off particulate matter, such as fly ash, in the second cleaner gas.

As used herein, the term "cyclone" is meant to denote a unit arranged to carry out cyclonic separation, viz. to remove particulates from gas or liquid stream, without the use of filters, through vortex separation. The cyclones each have an outlet in the bottom for letting solid matter from the gas exit. The burner is for example an air blown burner.

In an embodiment of the invention, the overall gas flow through the special piping element from an inlet from the second cyclone unit to an outlet to the gas distribution unit is substantially vertical. Typically, the special piping element is arranged vertically, so that the gas flow is vertical.

In an embodiment, the first cyclone, the second cyclone, the special piping element and the gas distribution unit is positioned along a substantially vertical axis. The first and second cyclones, the special piping element and the gas distribution unit as well as at least the pipe arranged to lead the second cleaner gas to the special piping element are advantageously centred on the substantial vertical axis. Thus, when the burner in the special piping element heats up particulate matter of the second cleaner gas, the particulate matter becomes sticky and agglomerates to larger particles that may stick to the inner walls of the special piping element. After some time of operation, the agglomerated particulate matter cracks off and falls down into the second cyclone via the pipe arranged to lead the second cleaner gas from the second cyclone to the special piping element. The agglomerated particulate matter that falls down into the second cyclone is removed from the second cyclone together with any other solid matter removed from the second cyclone. Thus, due to the vertical arrangement of the first and second cyclone and the special piping element, agglomerated particulate matter falls down into the second cyclone and may be removed from the system. Typically, the first cyclone is operated in continuous separation mode, whilst the second cyclone operates in batch separation mode.

In an embodiment, a characteristic inner dimension $d_{SPE}$ of said special piping element is dimensioned in relation to the diameter of the second cyclone and/or in relation to the pipe between the special piping element and the second cyclone so as to allow agglomerates formed within the special piping element to be led down to the second cyclone.

The special piping element is typically cylindrical and then the characteristic inner dimension is in this case the inner diameter. In a case where a horizontal cross section through the special piping element is not a circle, the characteristic inner dimension is meant to denote the diameter of a circle having substantially the same area as the horizontal cross section.

It is advantageous that the pipe arranged to lead said second cleaner gas from the second cyclone to the special piping element is also positioned and dimensioned to allow agglomerates formed within the special piping element to be lead down to the second cyclone. Here, these agglomerates may be removed during the operating of the second cyclone.

The low content of fine dust and fly ash particles in the second cleaner gas inlet into the special piping element may agglomerate into bigger agglomerates when passed to the burner of the special piping element. Such bigger agglomerates may adhere to the inner wall of the special piping element, and will—when the agglomerates are big enough—break off and drop down into the second cyclone below the special piping element. Thus, the separator system of the invention allows for bigger agglomerated dust and fly ash particles to be collected and removed under operating systems.

In an embodiment, the second cyclone has an inner diameter, $d_{C2}$, and the special piping element has a characteristic inner dimension $d_{SPE}$, where $d_{SPE}$ is between $\frac{3}{4}d_{C2}$ and $d_{C2}$, and where the inner diameter of the piping between the special piping element and the second cyclone is between $\frac{1}{2}d_{SPE}$ and $d_{SPE}$. Thus, the inner diameter of the pipe between the special piping element and the second cyclone is not larger than the inner diameter of the special piping element. These dimensions are advantageous to ensure that agglomerates of solid matter in the second cleaner air heated by the burner in the special piping element are able to fall down into the second cyclone.

Another aspect of the invention relates to a tar reformer system comprising a separator system according to the invention as well as one or more tar reformer units downstream of the separator system. The tar reformer system is typically positioned downstream a biomass gasification system.

In an embodiment, the tar reformer system comprises two or more tar reformer units, wherein the gas distribution system of the separator system is arranged to distribute the heated third cleaned gas exiting the gas distribution system evenly to the two or more tar reformer units. Typically, the tar reformer units are positioned around the separator system, e.g. symmetrically. When the tar reformer system comprises more than one tar reformer unit, it is possible to regenerate catalyst housed in one tar reformer unit whilst continuing operation of the tar reformer system and thus of an upstream biomass gasification system.

Yet another aspect of the invention relates to a method for treating a gas from a biomass gasification system, said method comprising the steps of:

inletting the gas from the biomass gasification system to a first cyclone and operating said first cyclone to remove particulate matter from the gas from the biomass gasification unit and to provide a first cleaner gas, leading the first cleaner gas from said first cyclone to a second cyclone and operating said second cyclone to remove particulate matter from said first cleaner gas in order to provide a second cleaner gas, leading said second cleaner gas to a special piping element comprising a burner and operating said burner for heating the second cleaner gas and burning off particulate matter in the second cleaner gas, thereby providing a third cleaned gas, and via a gas distribution unit, distributing said third cleaned gas to one or more tar reformer units. The method provides the same advantages as described above in relation to the separator system.

In an embodiment, the method of the invention further comprises the step of:

carrying out tar reforming over a tar reforming catalyst in one or more tar reformer units, each having one or more beds of tar reformer catalyst.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION OF THE DRAWINGS

Figure 1:
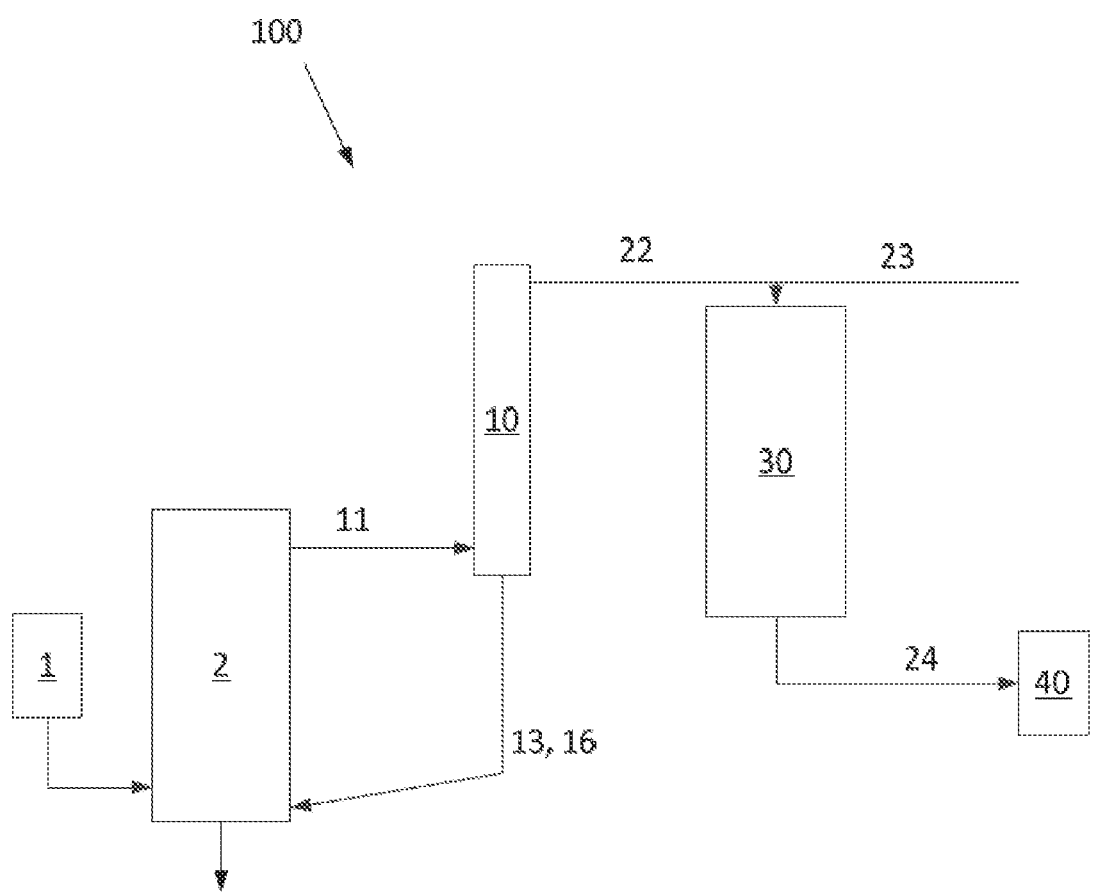
FIG. 1 illustrates a biomass gasification and tar reforming system 100.

FIG. 1 illustrates a biomass gasification and tar reforming system 100. The biomass gasification and tar reforming system 100 comprises a biomass gasification unit 2 arranged to being fed with biomass 1 via a biomass feeding system. The gas 11 from the biomass gasification system is led to the separator system 10 in order to provide a cleaned and heated gas, which is then led to one or more tar reformer system(s) 30. An oxidant gas 23, such as air, oxygen or steam, is also led to the tar reformer system(s) 30. The tar reformer system(s) 30 produces a syngas 24, which is optionally led to a syngas clean-up system 40.

Figure 2:
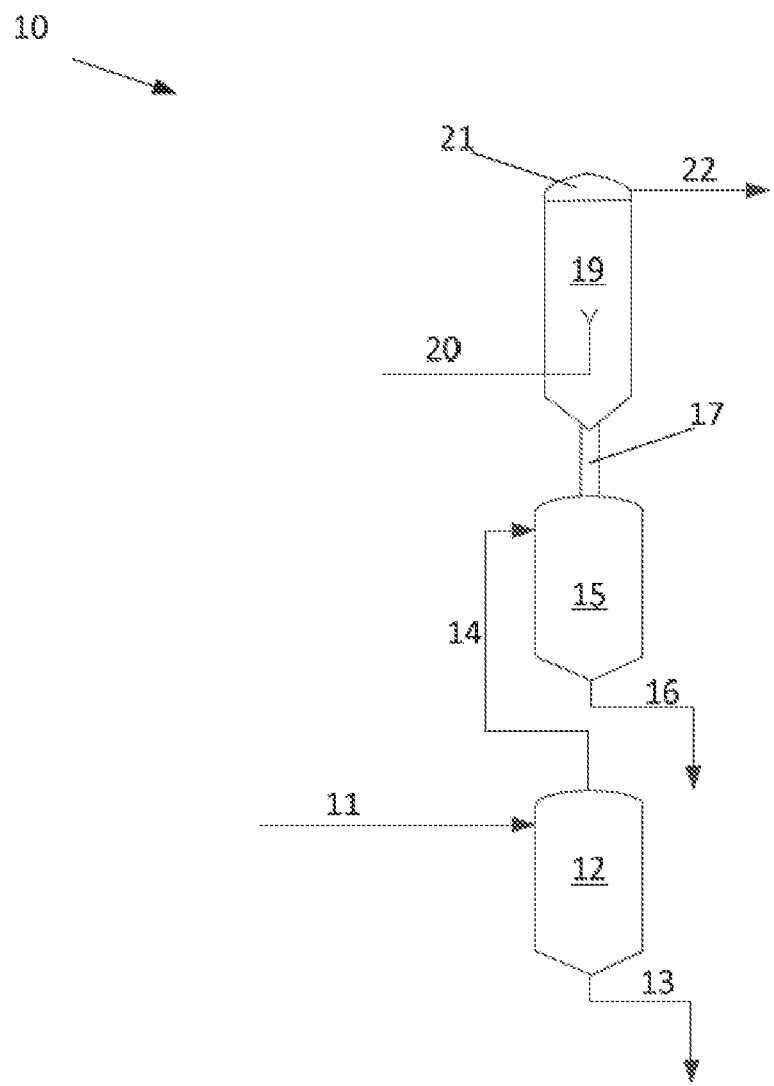
FIG. 2 illustrates a separator system 10 according to the invention for use in a biomass gasification and tar reforming system.

FIG. 2 illustrates a separator system 10 according to the invention for use in a biomass gasification and tar reforming system.

The separator system 10 comprises a first cyclone 12 and a second cyclone 15. Gas 11 from a biomass gasification unit 2 (see FIG. 1) enters the first cyclone 12 via an inlet (not shown).

The first cyclone 12 is arranged for separating and removing particulate matters from a gas through vortex separation. The first cyclone 12 has an outlet at or close to the bottom thereof in order to let solid matter separated from gas exit. This is indicated by the arrow 13.

The gas resulting from the separating off of particulate matter from the gas 11 from the biomass gasification unit is denoted "first cleaner gas" and is led to the second cyclone unit 15 via piping 14 arranged to lead the first cleaner gas from said first cyclone to the second cyclone 15.

The second cyclone 15 is arranged to remove further particulate matter from the first cleaner gas in order to provide a second cleaner gas, which is lead to a special piping element 19 via a pipe 17.

The special piping element 19 comprises an air blown burner. Air 20 is inlet to the air blown burner via piping 20. In the special piping element 19 the second cleaner gas is heated and any remaining particulate matter is burned off in order to provide a heated third cleaned gas. This heated, third cleaned gas enters a gas distribution unit 21 arranged for distributing the heated third cleaned gas to one or more tar reformer units 30 via piping 22.

In FIG. 2, the special piping element 19 and the gas distribution unit 21 are shown as built together into one unit. Alternatively, the special piping element 19 and the gas distribution unit 21 could be separate units connected by one or more pipes.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

The invention claimed is:

1. A separator system for treating a gas from a biomass gasification system, said separator system comprising
   a first cyclone and a second cyclone, where said first cyclone comprises an inlet for receiving a gas from a biomass gasification unit, said first cyclone being arranged for removing particulate matter from the gas from the biomass gasification unit in order to provide a first cleaner gas,
   piping arranged to lead said first cleaner gas from said first cyclone to said second cyclone, where said second cyclone is arranged to remove particulate matter from said first cleaner gas in order to provide a second cleaner gas,
   a pipe arranged to lead said second cleaner gas to a special piping element, said special piping element comprising a burner for heating the second cleaner gas and burning off particulate matter in the second cleaner gas, thereby providing a third cleaned gas, and
   a gas distribution unit arranged to lead said third cleaned gas to one or more tar reformer units.

2. The separator system according to claim 1, wherein the overall gas flow through the special piping element from an inlet from the second cyclone unit to an outlet to the gas distribution unit is vertical.

3. The separator system according to claim 1, wherein the first cyclone, the second cyclone, the special piping element and the gas distribution unit is positioned along a vertical axis.

4. The separator system according to claim 1, where a characteristic inner dimension $d_{SPE}$ of said special piping element is dimensioned in relation to the diameter of the second cyclone and/or in relation to said pipe between the special piping element and the second cyclone so as to allow agglomerates formed within the special piping element to be led down to the second cyclone.

5. The separator system according to claim 4, wherein the second cyclone has an inner diameter, $d_{C2}$, and the special piping element has a characteristic inner dimension $d_{SPE}$, where $d_{SPE}$ is between $\frac{3}{4}d_{C2}$ and $d_{C2}$, and wherein the inner diameter of the piping between the special piping element and the second cyclone is between $\frac{1}{2}d_{SPE}$ and $d_{SPE}$.

6. A tar reformer system comprising the separator system according to claim 1, wherein the one or more tar reformer units are arranged downstream of the separator system.

7. The tar reformer system according to claim 6, said tar reformer system comprising two or more tar reformer units, wherein the gas distribution system of the separator system is arranged to distribute the heated third cleaned gas exiting the gas distribution system evenly to the two or more tar reformer units.

8. A method for treating a gas from a biomass gasification system, said method comprising the steps of:
   inletting the gas from the biomass gasification system to a first cyclone and operating said first cyclone to remove particulate matter from the gas from the biomass gasification unit and to provide a first cleaner gas,
   leading the first cleaner gas from said first cyclone to a second cyclone and operating said second cyclone to remove particulate matter from said first cleaner gas in order to provide a second cleaner gas,
   leading said second cleaner gas to a special piping element comprising a burner and operating said burner for heating the second cleaner gas and burning off particulate matter in the second cleaner gas, thereby providing a third cleaned gas, and
   via a gas distribution unit, distributing said third cleaned gas to one or more tar reformer units.

9. The method according to claim 8, further comprising the step of:
   carrying out tar reforming over a tar reforming catalyst in one or more tar reformer units, each having one or more beds of tar reformer catalyst.

* * * * *